US008498621B2

(12) United States Patent
Jones et al.

(10) Patent No.: US 8,498,621 B2
(45) Date of Patent: Jul. 30, 2013

(54) CELLULAR DEVICE MANAGEMENT

(75) Inventors: Gregory Jones, Dallas, TX (US); Corey Jones, Euless, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 719 days.

(21) Appl. No.: 12/195,309

(22) Filed: Aug. 20, 2008

(65) Prior Publication Data

US 2010/0048192 A1 Feb. 25, 2010

(51) Int. Cl.
*H04L 12/58* (2006.01)
*H04M 3/00* (2006.01)

(52) U.S. Cl.
USPC .................. 455/412.1; 455/419; 455/420

(58) Field of Classification Search
USPC ....................... 455/412.1, 419, 420
See application file for complete search history.

(56) References Cited

U.S. PATENT DOCUMENTS

| | | | |
|---|---|---|---|
| 2001/0013569 A1 | 8/2001 | Donati | |
| 2002/0059073 A1* | 5/2002 | Zondervan et al. | 704/270.1 |
| 2004/0029567 A1 | 2/2004 | Timmins et al. | |
| 2004/0220943 A1* | 11/2004 | Ross et al. | 707/100 |
| 2005/0027716 A1 | 2/2005 | Apfel | |
| 2005/0047580 A1 | 3/2005 | Mow et al. | |
| 2005/0085225 A1* | 4/2005 | Benco et al. | 455/424 |
| 2005/0164651 A1 | 7/2005 | Ollis et al. | |
| 2005/0288006 A1 | 12/2005 | Apfel | |
| 2006/0026198 A1 | 2/2006 | Emery et al. | |
| 2006/0041603 A1 | 2/2006 | Paterson et al. | |
| 2007/0121882 A1 | 5/2007 | Timmins et al. | |
| 2007/0250645 A1 | 10/2007 | Meadows et al. | |
| 2008/0218309 A1* | 9/2008 | Steenstra et al. | 340/5.8 |

* cited by examiner

*Primary Examiner* — Kamran Afshar
*Assistant Examiner* — Omoniyi Obayanju
(74) *Attorney, Agent, or Firm* — Guntin & Gust, PLC; Andrew Gust

(57) ABSTRACT

A server device of a communication system provides a web interface to allow a user to modify user interface settings and contact information. The server device communicates the modified settings and contact information to the mobile communication device via a wireless communication network. Accordingly, the user can conveniently configure user interface settings, such as ring tones, alarm settings, or the like, via a web interface, rather than through a cumbersome interface at the mobile communication device. In addition, the user interface settings are communicated to the mobile communication device via the same wireless communication network that carries voice data. Thus, the user interface of the mobile communication device, as well as the stored contact information, can be updated without requiring the user to connect the device to a computer.

24 Claims, 2 Drawing Sheets

CELLULAR DEVICE MANAGEMENT

FIELD OF THE DISCLOSURE

The present disclosure generally relates to mobile communication devices and more particularly relates to management of information at a mobile communication device.

BACKGROUND

Mobile communication devices can incorporate a wide range of features, including contact information lists, calendars, alarms, games, programmable ring tones, or the like. Each feature can include one or more user-programmable settings, such as an alarm time, a ring tone type, or the like. Accordingly, a mobile communication device with a large number of features will likely also have a large number of possible settings. A user interface can be provided to permit the user to program each setting, but such interfaces can be cumbersome, inefficient, or difficult to learn, resulting in a poor user experience.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods, records, or computer-readable media. Moreover, some statements may apply to some innovative features but not to others.

FIGS. 1-4 illustrate systems and methods for configuring both a user interface of a mobile communication device and contact information stored at the device. In particular, a server device of a communication system provides a web interface to allow a user to modify user interface settings and contact information. The server device communicates the modified settings and contact information to the mobile communication device via a wireless communication network. Accordingly, the user can conveniently configure user interface settings, such as ring tones, alarm settings, or the like, via a web interface, rather than through a cumbersome interface at the mobile communication device. In addition, the user interface settings are communicated to the mobile communication device via the same wireless communication network that carries voice data. Thus, the user interface of the mobile communication device, as well as the stored contact information, can be updated without requiring the user to connect the device to a computer.

Figure 1:
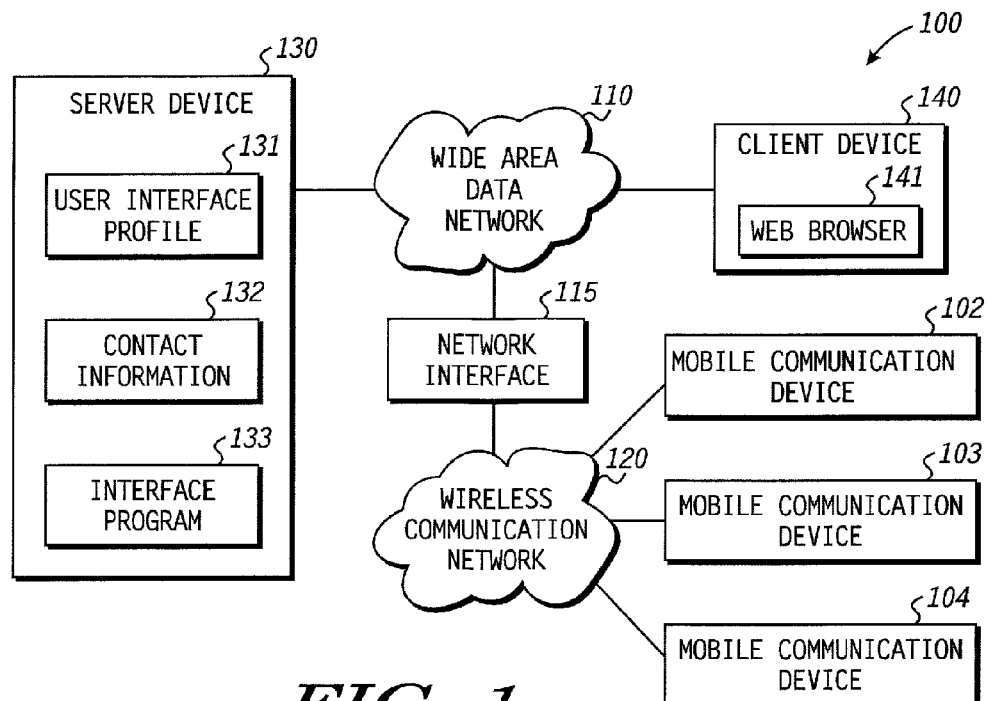
FIG. 1 is a block diagram of a communication system in accordance with one embodiment of the present disclosure.

To illustrate the methods and systems described briefly above, FIG. 1 depicts a particular embodiment of a communication system 100, including mobile communication devices 102, 103, and 104, a wide-area data network 110, a wireless communication network 120, and a network interface 115. The communication system 100 further includes a server device 130 and a client device 140, each connected to the wide-area data network 110. The wide area data network 110 and the wireless communication network 120 are connected via the network interface 115.

Mobile communication devices 102-104 are devices configured to provide an interface for communication of voice data and other information between the mobile communication device and the wireless communication network 120, thereby allowing a user of the mobile communication device to establish and conduct a communication session with another user. In at least one embodiment, each of the mobile communication devices 102-104 is a cellular telephone or similar device that provides a user interface, via a set of user interface devices, to communicate information to the user. The user interface devices can include input devices, such as a physical or virtual keypad, a microphone for voice inputs, and the like, and also include display devices, such a display screen and audio speakers, to provide information to the user. Each user interface device can be configured based on one or more settings to customize the user interface. For example, the display screen can have a variable brightness, audio speakers can have variable volume, or the like.

Each of the mobile communication devices 102-104 can provide a set of customizable user interface features, such as customizable ring tones, alarms, games, or the like, via the user interface devices. Each feature can be associated with one or more programmable user interface settings. Thus, a ring tone feature can have a programmable ring tone, an alarm feature can have a programmable alarm time, and the like.

The wireless communication network 120 is a network of devices configured to communicate voice data and other information between mobile communication devices 102-104. Accordingly, in response to receiving a phone number or other target device information from a mobile communication device, the wireless communication network establishes a connection between the source device and the target device. In an embodiment, the connection can be a virtual connection, established via a packet-switched communication protocol implemented by the wireless communication network 120.

It will be appreciated that the communication network 120 is referred to as a wireless communication network to indicate that it communicates information to the mobile communication devices 102-104 wirelessly, but that information may be communicated through the network via physical transmission lines, such as fiber optic or other connections. Accordingly, the wireless communication network 120 can include one or more devices (not shown) to convert information to and from a wireless communication format to a transmission line format. For example, the wireless communication network 120 can include a device to convert information on a data transmission line to a wireless signal of appropriate frequency for communication to one of the mobile communication devices 102-104.

The wireless communication network 120 can be configured to communicate both voice information (to allow for voice communication between mobile communication devices) and data information to allow for transfers of data between mobile communication devices. This allows for transfer of user interface settings to a particular mobile communication device, as described above.

Wide-area data network 110 is a packet-switched network, such as the Internet, configured to route communications between data network-enabled devices, such as the server device 130 and the client device 140. In particular, the client device 140 is a computer device configured to execute a web browser 141. Via the web browser, the user of client device 140 can request information, such as web page information, from server device 130. The wide-area data network 110 routes the request to the server device 130, and routes information provided in response to the client device 140 for display via the web browser 141.

The server device 130 provides an interface program 133 to allow the user of the client device 140 to adjust information, including a user interface profile 131 and contact information 132 associated with one or more mobile communication devices. The user interface profile 131 includes one or more settings for the user interface of the mobile communication devices, such as ring tones, alarm time settings, game settings, or the like. The contact information 132 includes phone number information, chat program identification information, or other contact information for designated users. The interface program 133 provides a way for the user to alter the user interface settings and contact information for a mobile communication device without using the interface at the mobile communication device itself.

In particular, the interface program 133 provides a web interface that can be displayed at the web browser 141. The user interacts with the displayed web interface to adjust one or more user interface settings, or one or more contact information items. Information indicative of the user interactions are communicated to the server device 130 via the wide-area data network 110. Based on the user's interactions, the interface program adjusts the user interface profile 131 and the contact information 132. In addition, data can also be uploaded through the interface program 133 to the server device 130 updating the user interface profile 131, including but not limited to, pictures, music, videos or the like.

The server device 130 can also receive requests to update the user interface settings and contact information for a particular mobile communication device. The requests can be received from the mobile communication device itself, from the client device 140, and the like. In response the server device 130 provides the user interface profile 131 and the contact information 132 to the wide-area data network 110, which routes the provided information to the network interface 115. In response, network interface 115 converts the information to an appropriate format for communication via the wireless communication network 120, and provides the converted information to the network. The wireless communication network converts the user interface profile 131 and contact information 132 to a wireless signal and communicates the wireless signal to the designated wireless communication device.

In an embodiment, each of the wireless communication devices 102-104 can have its own internal data format for storage of user interface settings and contact information. Accordingly, in response to a request to update user interface settings or contact information for a designated mobile communication device, the server device 130 can convert the user interface profile 131 and the contact information 132 to the appropriate format for the designated device. Further, the server device 130 can receive requests to update multiple mobile communication devices associated with the user. Accordingly, in response to such requests, the server device 130 can convert the user interface profile 131 and the contact information 132 to the appropriate format for each mobile communication device, and communicate the converted data to each device as described above.

In addition, the server device 130 can communicate the user interface profile 131 and the contact information 132 in response to requests, or based on the expiration of a defined or programmable amount of time. For example, the server device 130 can periodically synchronize the user interface profile 131 and contact information 132 with a designated mobile communication device based on the defined or programmable amount of time. In conjunction with the synchronization, the server device 130 can communicate the user interface profile 131 and contact information 132 to the mobile communication device as described above. Further, the server device 130 can receive information from the mobile communication device indicating an update to the user interface profile 131 or the contact information 132, and make the indicated adjustments to the stored information. Accordingly, after synchronization, the user interface profile 131 and contact information 132 can reflect changes in user interface settings and contact information made at the mobile communication device. In addition, the server device 130 can maintain previous versions of user interface profile 131 to enable the user to recall a previous user interface profile in case of accidental change, data corruption or the like.

Figure 2:
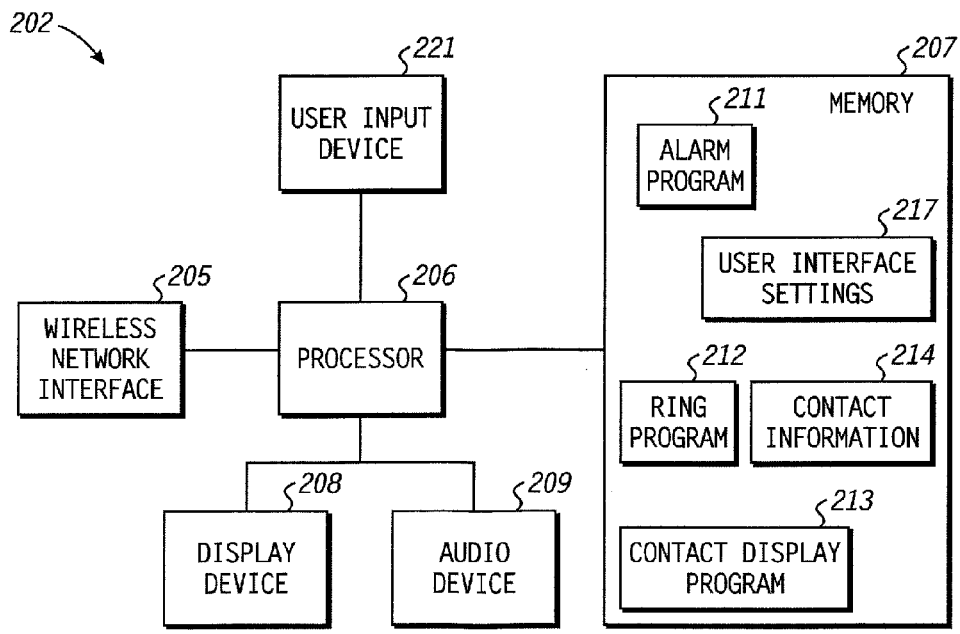
FIG. 2 is a block diagram of a particular embodiment of a mobile communication device of FIG. 1.

FIG. 2 illustrates a particular embodiment of a mobile communication device 202, corresponding to the mobile communication device 102 of FIG. 1. The mobile communication device 202 includes processor 206 connected to a wireless network interface 205, a memory 207, a display device 208, an audio device 209, and a user input device 221. The wireless network interface 205 is configured to receive information from the wireless communication network 120, convert the information to an appropriate format for internal communication at the mobile communication device 202, and communicate the converted information to the processor 206. In addition, the wireless network interface can receive information from the processor 206 and communicate it to the wireless communication network 120.

The processor 206 is configured to execute sets of computer instructions stored as programs at the memory 207 in order to implement one or more features of the mobile communication device 202. For example, in the illustrated embodiment of FIG. 2, the memory stores alarm program 211, ring program 212, and contact display program 213. The processor 206 can execute each of the programs to implement the associated feature. Thus, in response to an indication from the wireless network interface 205, the processor 206 can execute ring program 212. Similarly, in response to a request from the user input device 221, indicating a request to display contact information, the processor 206 can execute contact display program 213. It will be appreciated that the processor 206 can execute additional programs not illustrated, such as one or more programs that allow a user to conduct a phone call, enter or view a text message, or the like.

In conjunction with execution of the programs, as described above, the processor 206 can control display device 208 and audio device 209 to provide information to the user. Further, the processor 206 can receive information from the user input device, allowing the user to interact with the program being executed. For example, when executing the contact display program 213, the processor 206 can display contact information 214 via the display device 208, and receive information via the user input device 221 indicating selection of a particular contact. In response, the processor 206 can execute another program (not shown) to initiate a phone call or other communication session with the indicated contact.

In conjunction with execution of the programs, the processor 206 can access the user interface settings 217 and the contact information 214. In particular, the user interface settings 217 include one or more user-programmable user interface settings for particular device features, including ring tone settings, volume settings, display brightness settings, alarm time settings, game settings, or the like. Further, contact information 214 includes user-programmable contact information for designated contacts. Accordingly, the user interface settings 217 and contact information 214 provide a basis for user customization of the features provided by the programs 212-213. For example, during execution of the ring program 212, the processor 206 can access the user interface settings 217 to determine a ring tone selected by the user, and play the selected ring tone via the audio device 209.

As explained above with respect to FIG. 1, the user interface profile 131 and contact information 132 can be updated by the user via the interface program 133, and the updated information communicated to the mobile communication device 202 via the wireless communication network 120. Accordingly, the wireless network interface 205 receives the updated information, and communicates it to the processor 206. In response, the processor 206 updates the user interface settings 217 and contact information 214. Thus, updates to the user interface profile 131 and contact information 132 are reflected at the locally stored user interface settings 217 and contact information 214, allowing the user to update the locally stored information via a convenient web interface.

Figure 3:
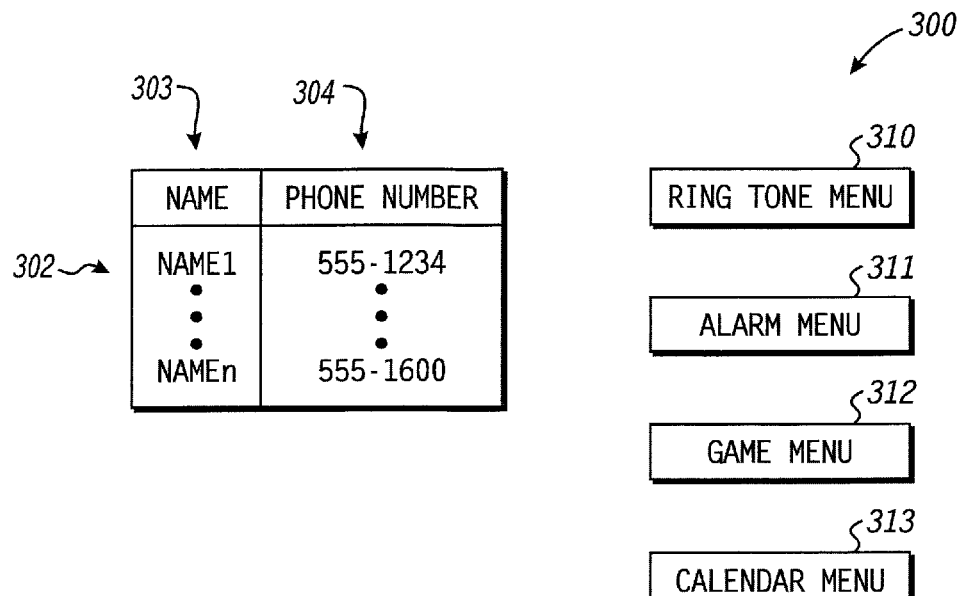
FIG. 3 is a diagram of a web interface for configuration of user interface settings for a mobile communication device in accordance with one embodiment of the present disclosure.

FIG. 3 illustrates a particular embodiment of a web interface 300 that can be provided by the interface program 133, as described above. Web interface 300 includes a contact information panel 302, a ring tone menu button 310, an alarm menu button 311, a game menu 312, and a calendar menu 313. The contact information panel 302 includes a name column 303 to display contact name information and a phone number column 304 to display phone number information corresponding to the associated contact name. Via interactions with the web browser 141, a user can enter new names and phone numbers in the contact information panel 302, adjust existing names and phone numbers, and the like. Changes to the contact information panel 302 are communicated to the interface program 133 at the server device 130. In response, the interface program 133 can make commensurate changes to the contact information 132.

In addition, the user can actuate one of buttons 310-313 to display an associated menu. The displayed menu provides a set of selectable options for the user and, based on the selected option, the web browser 141 communicates information to the interface program 133, which in turn updates the appropriate user interface setting at the user interface profile 131. For example, in response to the user actuating the ring tone menu button 310, a list of available ring tones can be displayed. In response to a user selecting a ring tone from the list, the interface program updates the ring tone setting stored at the user interface profile 131. In response to actuation of the calendar menu button 313, a list of dates can be displayed, allowing a user to enter appointment information or the like. The information is communicated to the interface program 133, which updates corresponding calendar information stored at the user interface profile 131.

In response to updates to the user interface profile 131 or the contact information 132, the server device 130 can update corresponding information at one or more of the mobile communication devices 102-104, as described above. Accordingly, the web interface 300 provides an accessible interface to allow the user to conveniently adjust the settings of a mobile communication device without learning or interacting with a cumbersome interface.

Figure 4:
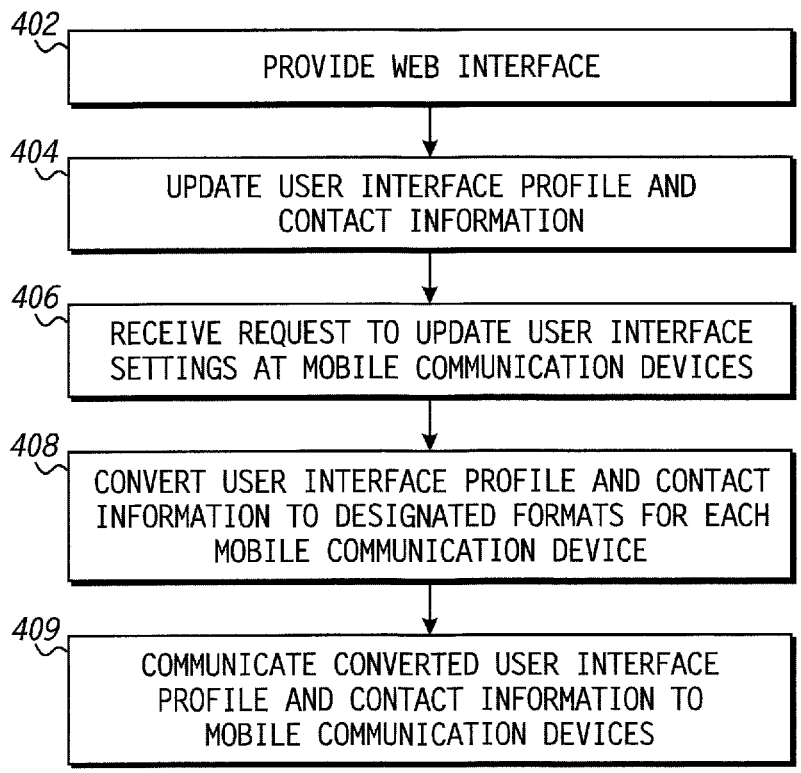
FIG. 4 is a flow diagram of a method of configuring a user interface for a mobile communication device in accordance with one embodiment of the present disclosure.

FIG. 4 illustrates a flow diagram of a particular embodiment of a method of configuring a user interface of a mobile communication device. At block 402, the server device 130 provides a web interface, such as web interface 300 of FIG. 3 to the web browser 141. In response to the user's interaction with the web interface, the server device 130 receives updates to the user interface profile 131 and the contact information 132 at block 404. At block 406, the server device 130 receives a request to update user interface settings of the mobile communication devices 102-104. In response, at block 408, the server device 130 converts the user interface profile 131 and contact information 132 to appropriate formats for each of the mobile communication devices 102-104. In an embodiment, the formats are different for each mobile communication device. At block 409, the server device 130 communicates the converted user interface profiles and contact information to the wide area data network 110, which in turn communicates the converted profiles and information to the wireless communication network 120 for provision to the mobile communication devices 102-104.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
providing an interface program, using a server device, to receive a plurality of updates corresponding to a plurality of programmable user interface features and a stored contact list of a mobile communication device upon receiving a request to update the mobile communication device, the plurality of programmable user interface features including a ring tone setting, a volume setting, an alarm setting, and a game setting, the plurality of programmable user interface features being updated with a video data and
updating the mobile communication device, using the server device, with the received plurality of updates, the server device maintaining previous versions of the programmable user interface features to enable a recall of any of the previous versions of the programmable user interface features, the recall being necessitated by at least one of an accidental change or a data corruption;
wherein the interface program is a web interface including a contact information panel, a ring tone menu button, and alarm menu button, a game menu, and a calendar menu, the contact information panel including a name column to display a name information and a phone number column to display a phone number corresponding to the name information, the contact information panel enabling an entry of a new contact information and an adjustment to an existing contact information.

2. The method of claim 1, wherein the game setting includes a customizable mobile game setting.

3. The method of claim 1, wherein the plurality of programmable user interface features further includes a screen brightness setting.

4. The method of claim 1, wherein the request is received in response to an expiration of a defined period of time.

5. The method of claim 1, wherein the request is received from the mobile communication device.

6. The method of claim 1, wherein the request is received via a wireless communication network.

7. The method of claim 1, wherein the receiving of the request comprises:
receiving an identification information for the mobile communication device;
determining a data format based on the identification information; and
communicating the plurality of updates to the mobile communication device upon converting the plurality of updates to the data format.

8. A method, comprising:
providing an interface program, using a server device, to receive a plurality of updates corresponding to a plurality of programmable user interface features of a plurality of mobile communication devices, the plurality of programmable user interface features including a ring tone setting, a volume setting, an alarm setting, and a game setting, the plurality of programmable user interface features being updated with a video data; and
updating the plurality of mobile communication devices, using the server device, with the received plurality of updates, the server device maintaining previous versions of the programmable user interface features to enable a recall of any of the previous versions of the programmable user interface features, the recall being necessitated by at least one of an accidental change or a data corruption;
wherein the interface program is a web interface including a contact information panel, a ring tone menu button, and alarm menu button, a game menu, and a calendar menu, the contact information panel including a name column to display a name information and a phone number column to display a phone number corresponding to the name information, the contact information panel enabling an entry of a new contact information and an adjustment to an existing contact information.

9. The method of claim 8, wherein the plurality of mobile communication devices comprises a first mobile communication device and a second mobile communication device.

10. The method of claim 9, wherein communicating the plurality of updates further comprises:
determining a second device type associated with the second mobile communication device;
converting the plurality of updates to a second data format to determine a second converted plurality of updates, the second data format being based on the second device type; and
communicating the second converted plurality of updates to the wireless communication network.

11. A method, comprising:
communicating to a mobile communication device, using a server device, a plurality of updates corresponding to a plurality of programmable user interface features and a stored contact list of a mobile communication device, the plurality of programmable user interface features including a ring tone setting, a volume setting, an alarm setting, and a game setting, the plurality of programmable user interface features being updated with a video data; and
implementing, using the server device, the plurality of updates on the mobile communication device, the server device maintaining previous versions of the programmable user interface features to enable a recall of any of the previous versions of the programmable user interface features, the recall being necessitated by at least one of an accidental change or a data corruption;
wherein the plurality of updates are specified using an interface program provided by the server device, the interface program including a contact information panel, a ring tone menu button, and alarm menu button, a game menu, and a calendar menu, the contact information panel including a name column to display a name information and a phone number column to display a phone number corresponding to the name information, the contact information panel enabling an entry of a new contact information and an adjustment to an existing contact information.

12. The method of claim 11, wherein the plurality of updates are communicated to the mobile communication device in response to an expiration of a defined period of time.

13. The method of claim 11, wherein the plurality of updates are communicated to the mobile communication device in response to a user interaction with the mobile communication device.

14. A system, comprising:
a mobile communication device; and
a server device in communication with the mobile communication device, the server device performing functions including:
  providing an interface program to receive a plurality of updates corresponding to a plurality of programmable user interface features and a stored contact list of a mobile communication device upon receiving a request to update the mobile communication device, the plurality of programmable user interface features including a ring tone setting, a volume setting, an alarm setting, and a game setting, the plurality of programmable user interface features being updated with a video data; and
  updating the mobile communication device with the received plurality of updates, the server device maintaining previous versions of the programmable user interface features to enable a recall of any of the previous versions of the programmable user interface features, the recall being necessitated by at least one of an accidental change or a data corruption;
  wherein the interface program is a web interface including a contact information panel, a ring tone menu button, and alarm menu button, a game menu, and a calendar menu, the contact information panel including a name column to display a name information and a phone number column to display a phone number corresponding to the name information, the contact information panel enabling an entry of a new contact information and an adjustment to an existing contact information.

15. A mobile communication device, comprising:
a processor; and
an input device in communication with the processor to perform functions including:
  receiving from a server device an interface program, the interface program being a web interface having a plurality of panels for a plurality of programmable user interface features and a contact list, the plurality of programmable user interface features including a ring tone setting, a volume setting, an alarm setting, and a game setting, the contact information panel including a name column to display a name information and a phone number column to display a phone number corresponding to the name information, the contact information panel enabling an entry of a new contact information and an adjustment to an existing contact information; and
  inputting a plurality of updates corresponding to the plurality of programmable user interface features and the contact list of the mobile communication device, the plurality of programmable user interface features being updated with a video data, the inputted plurality of updates being received at the server device;
  wherein the server device maintains previous versions of the programmable user interface features to enable a recall of any of the previous versions of the programmable user interface features, the recall being necessitated by at least one of an accidental change or a data corruption.

16. The method of claim 1, wherein the plurality of programmable user interface features is further updated with at least one of a picture data or a music data.

17. The method of claim 7, wherein the converted plurality of updates is communicated via a wide area network.

18. The method of claim 8, wherein the plurality of programmable user interface features is further updated with at least one of a picture data or a music data.

19. The method of claim 9, wherein communicating the plurality of updates comprises:
  determining a first device type associated with the first mobile communication device;
  converting the plurality of updates to a first data format to determine a first converted plurality of updates, the first data format being based on the first device type; and
  communicating the first converted plurality of updates to the wireless communication network.

20. The method of claim 11, wherein the plurality of programmable user interface features is further updated with at least one of a picture data or a music data.

21. The system of claim 14, wherein the plurality of programmable user interface features is further updated with at least one of a picture data or a music data.

22. The system of claim 14, wherein the plurality of updates are communicated to the mobile communication device via a wide area network.

23. The mobile communication device of claim 15, wherein the plurality of programmable user interface features is further updated with at least one of a picture data or a music data.

24. The mobile communication device of claim 15, wherein the programmable user interface features further includes a screen brightness setting.

* * * * *